United States Patent
Rodriguez-Sanchez et al.

(10) Patent No.: US 8,441,928 B2
(45) Date of Patent: *May 14, 2013

(54) REAL-TIME RATE CONTROL MECHANISM FOR MULTI-RATE DATA TRANSMISSIONS IN WIRELESS NETWORKS

(75) Inventors: Jose Rodriguez-Sanchez, Seattle, WA (US); Derek Hilborn, Seattle, WA (US); Eamonn Gormley, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/829,813

(22) Filed: Jul. 2, 2010

(65) Prior Publication Data

US 2010/0265822 A1   Oct. 21, 2010

Related U.S. Application Data

(63) Continuation of application No. 12/480,509, filed on Jun. 8, 2009, now Pat. No. 7,773,520, which is a continuation of application No. 11/713,691, filed on Mar. 5, 2007, now Pat. No. 7,554,912, which is a continuation of application No. 10/116,160, filed on Apr. 5, 2002, now Pat. No. 7,230,922.

(51) Int. Cl.
*H04J 3/14* (2006.01)

(52) U.S. Cl.
USPC .......................... 370/232; 370/329; 370/468

(58) Field of Classification Search ............ 370/232, 370/329, 468
See application file for complete search history.

(56) References Cited

U.S. PATENT DOCUMENTS

| | | | |
|---|---|---|---|
| 5,483,676 A | 1/1996 | Mahany et al. | |
| 5,912,921 A | 6/1999 | Warren et al. | |
| 6,141,353 A | 10/2000 | Li | |
| 6,229,795 B1 | 5/2001 | Pankaj et al. | |
| 6,292,476 B1 | 9/2001 | Zehavi et al. | |
| 6,393,012 B1 | 5/2002 | Pankaj et al. | |
| 6,836,480 B2 | 12/2004 | Basso et al. | |
| 7,016,318 B2 | 3/2006 | Pankaj et al. | |
| 7,230,922 B1 * | 6/2007 | Rodriguez-Sanchez et al. | 370/232 |
| 7,298,719 B2 | 11/2007 | Andrews | |
| 7,406,098 B2 | 7/2008 | Taneja et al. | |

(Continued)

FOREIGN PATENT DOCUMENTS

| WO | 0111828 | 2/2001 |
|---|---|---|
| WO | 03088604 | 10/2003 |

OTHER PUBLICATIONS

Sanot, et al, Monitoring-based flow control for reliable multicast protocols and its evaluation, Performance, Computing, and Communications Conference, 1997, IEEE International Phoenix, Tempe, AZ, USA, Feb. 5-7, 1997, New York, NY, USA, IEEE, US, Feb. 197, pp. 403-409.

(Continued)

*Primary Examiner* — Albert T Chou
(74) *Attorney, Agent, or Firm* — Turocy & Watson, LLP

(57) ABSTRACT

Wireless networks are becoming increasingly heterogeneous in terms of the processing capabilities of network users' receiving equipment. According to embodiments of the innovation, in a communications network comprising a plurality of receivers with different data reception rate capabilities, data frames targeted to respective receivers may be transmitted to the receivers in accordance with the respective data reception rate capabilities of the receivers.

20 Claims, 4 Drawing Sheets

U.S. PATENT DOCUMENTS

| | | | |
|---|---|---|---|
| 7,554,912 B2 * | 6/2009 | Rodriguez-Sanchez et al. ............................. | 370/232 |
| 7,773,520 B2 * | 8/2010 | Rodriguez-Sanchez et al. ............................. | 370/232 |
| 2001/0006508 A1 | 7/2001 | Pankaj et al. | |

OTHER PUBLICATIONS

International Search Report mailed Jul. 16, 2003 for PCT Application No. PCT/US03/08721, 2 pages.

Office Action mailed Feb. 17, 2006 for Chinese Patent Application Serial No. 03812225.1, 16 pages.

Office action mailed Sep. 14, 2006 for Chinese Patent Application Serial No. 03812225.1, 8 pages.

Office Action mailed Jun. 30, 2008 for European Patent Application Serial No. 03714321.1, 7 pages.

Chinese Office Action dated Sep. 18, 2009 for CN Application Serial No. 200710089610.3, 5 pages.

Office action mailed Feb. 3, 2010 for Chinese Patent Application Serial No. 2007100896103.3, 4 pages.

Office Action dated Jan. 28, 2010 for U.S. Appl. No. 12/480,509, 10 pages.

Office Action dated Sep. 9, 2009 for U.S. Appl. No. 12/480,509, 16 pages.

CN OA dated May 6, 2011 for Chinese Patent Application No. 200710089610.3, 3 pages (untranslated).

* cited by examiner

REAL-TIME RATE CONTROL MECHANISM FOR MULTI-RATE DATA TRANSMISSIONS IN WIRELESS NETWORKS

PRIORITY CLAIM

This application claims priority to U.S. patent application Ser. No. 12/480,509, filed on Jun. 8, 2009, entitled "REAL-TIME RATE CONTROL MECHANISM FOR MULTI-RATE DATA TRANSMISSIONS IN WIRELESS NETWORKS" (now U.S. Pat. No. 7,773,520), which is a continuation of U.S. patent application Ser. No. 11/713,691, filed on Mar. 5, 2007, entitled "REAL-TIME RATE CONTROL MECHANISM FOR MULTI-RATE DATA TRANSMISSIONS IN WIRELESS NETWORKS" (now U.S. Pat. No. 7,554,912), which is a continuation of U.S. patent application Ser. No. 10/116,160, filed on Apr. 5, 2002, entitled "REAL-TIME RATE CONTROL MECHANISM FOR MULTI-RATE DATA TRANSMISSIONS IN WIRELESS NETWORKS" (now U.S. Pat. No. 7,230,922). The entirety of the aforementioned applications is incorporated by reference herein.

TECHNICAL FIELD

The present invention relates to data transmission in a communications network, and more particularly to a method and system for data transmission in a network wherein receivers of the network have different data reception rate capabilities.

BACKGROUND OF THE INVENTION

Multi-rate capabilities are increasingly becoming a necessity for wireless data networks. For example, to be competitive and allow a flexible sales strategy, network service providers may need to be able to offer customers different data rates at different prices.

Additionally, as technology advances, manufacturers and service providers are able to offer customers new generations of improved receiving equipment at regular intervals. This leads to a situation wherein some network users may have the newest equipment with the highest data reception rate capabilities, while others who may be unwilling to undertake the cost of an upgrade may have older equipment with lower data reception rate capabilities.

More generally, for various reasons, wireless networks of the future will tend to become increasingly heterogeneous in terms of the processing capabilities of users' receiving equipment.

Known data transmission methods in wireless networks either do not allow for a disparity in data reception rate capabilities among users, or typically do not efficiently handle such a disparity if it does exist. Rather, such data transmission methods may waste bandwidth in that data transmission rates must accommodate the user with the slowest equipment.

In view of the foregoing, a method and system are needed for efficiently handling data transmission in a wireless network wherein network users have different data reception rate capabilities.

SUMMARY OF THE INVENTION

According to embodiments of the present invention, in a communications network comprising a plurality of receivers with different data reception rate capabilities, data frames targeted to respective receivers may be transmitted to the receivers in accordance with the respective data reception rate capabilities of the receivers.

In one embodiment, a queue of data frames targeted to respective receivers may be maintained, and a data frame may be selected from the queue to transmit, based on the data reception rate capability of the target receiver of the selected data frame. To select the data frame, a data reception rate capability of the target receiver of the queued frame may be identified. If the data reception rate capability of the target receiver is not exceeded by transmitting the queued data frame in a next consecutive channel resource slot, the queued data frame may be transmitted to the target receiver. Otherwise, the queue may be searched for a data frame which can be transmitted in the next consecutive channel resource slot without exceeding the data reception rate capability of its target receiver.

DETAILED DESCRIPTION

Figure 1:
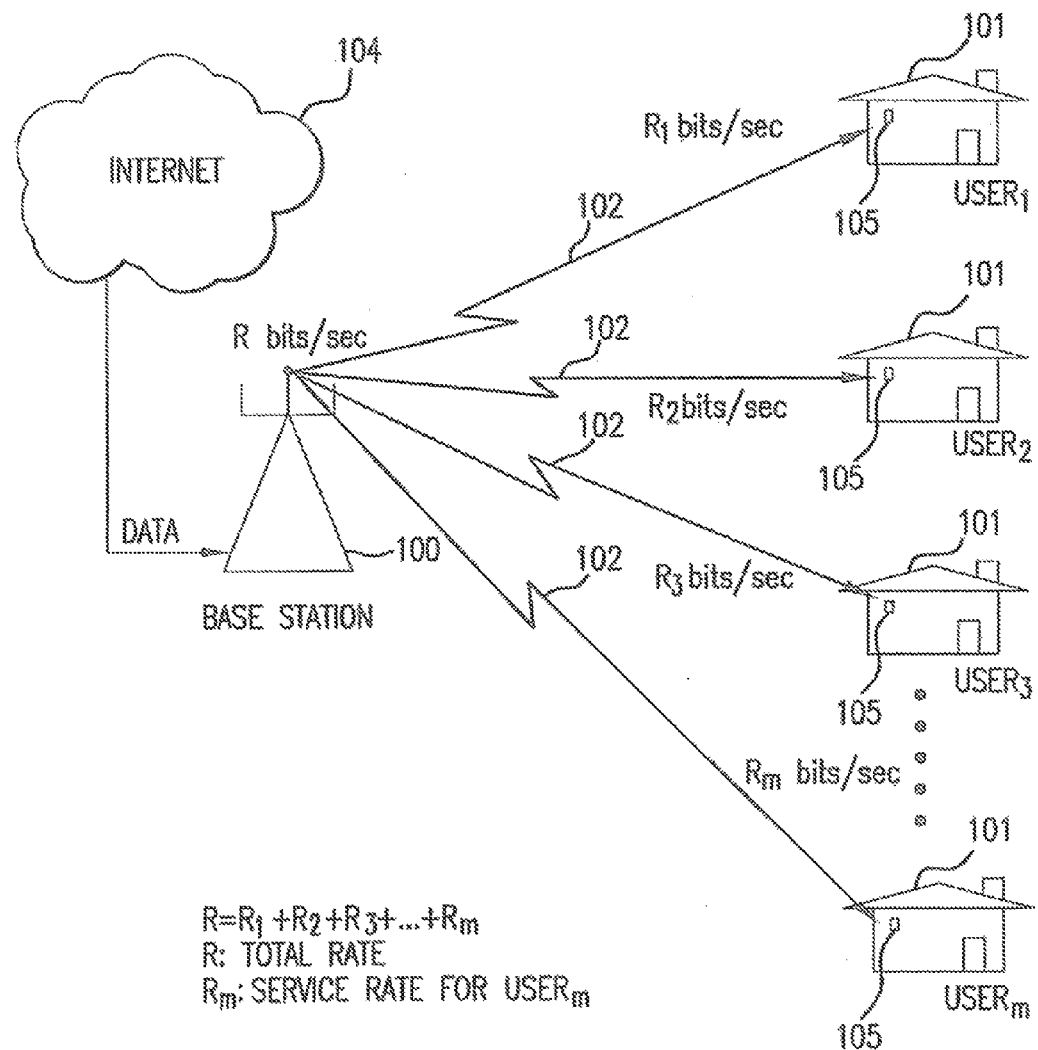
FIG. 1 shows an example of a wireless network configuration wherein users have different data reception rate capabilities.

According to embodiments of the invention, a rate controller for efficiently controlling the transmission of data to network users with different data reception rate capabilities may be embodied in a base station of a wireless communications network. FIG. 1 shows one possible configuration of such a wireless communications network. In FIG. 1, a plurality m of network users 101 may receive wireless transmissions 102 from a base station 100 of a wireless network. The users 101 are in fixed locations such as private residences or business offices in the example of FIG. 1, but it should be understood that the invention is not limited to fixed users, but could also include mobile users.

Users 1 through m may, for example, download information from an information source such as the Internet 104. The information will typically be in the form of data "frames" (also called "packets"), each formatted with a header for routing the data frame in a point-to-point fashion, according to some data protocol such as TCP/IP (Transmission Control Protocol/Internet Protocol), through the network to a target user. The downloaded information may, for example, be transmitted via a wired or wireless link to base station 100.

Each user 1-m may have a different data reception rate capability. More specifically, each user may have receiving equipment (referred to herein as a "receiver") with a different data reception rate capability than the receivers of the other users. A typical receiver 105 may be embodied as a modular unit which may be installed externally to a residence or office. A typical receiver may include a processor or processors and a receiving antenna. In known receivers, depending on such factors as processing speed, data reception rate capabilities may vary, for example, between 512 bits/sec and 2.5 Mbits/sec.

In the example of FIG. 1, base station 100 (or more particularly, a transmitter thereof) has a transmission bandwidth of R bits/sec. Thus, to service m receivers 105 with data reception rate capabilities of $R_1, R_2, R_3, \ldots R_m$ bits/sec, respectively, wherein, for example, $R_1 < R_2 < R_3 \ldots < R_m$, R may be equal to $R_1 + R_2 + R_3 + \ldots R_m$. It should of course be understood that not all receivers of a given network according to embodiments of the invention need have distinct data reception rate capabilities; more generally, some receivers of the network may have the same data reception rate capability.

It should be further understood that "data reception rate capability" as used herein refers not only to limitations of receiver technology such as processing speed, but also to limitations on a transmitted data rate which may be arbitrarily imposed, for example according to a pricing agreement with a user.

Figure 2:
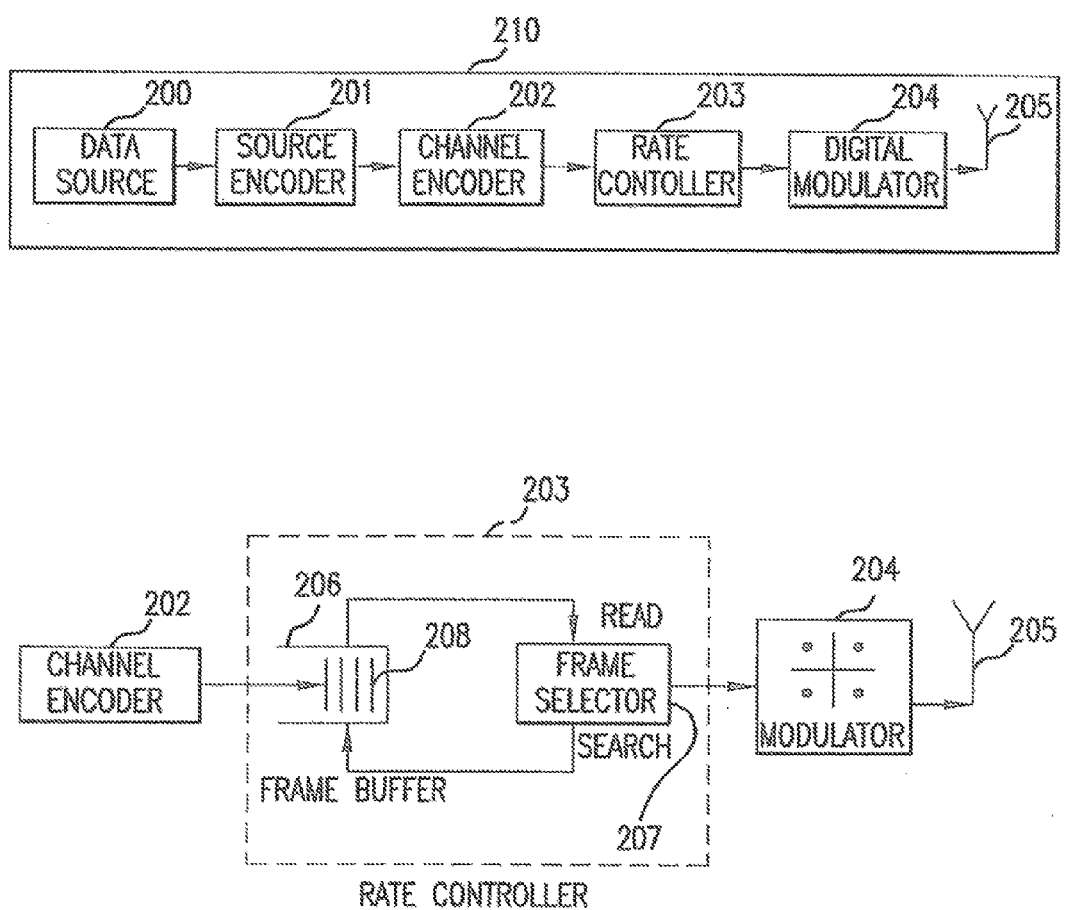
FIG. 2 is a block diagram showing embodiments of a base station and a rate controller according to the invention.

FIG. 2 shows more detail of elements of a transmitter 210 of base station 100 according to embodiments of the invention. The source encoder 201, channel encoder 202, digital modulator 204 and transmitter 205 are conventional and will not be discussed herein in significant detail. Briefly, a localized data source 200 may provide data to source encoder 201 of base station 100. Source encoder 201 may process the data from data source 200 to map source symbols in the data to an intermediate alphabet, typically a set of binary strings, and pass the processed data to channel encoder 202. Channel encoder 202 may map the data received from source encoder 201 into a set of coded bits or waveforms for transmission over a channel, performing such operations as adding error-checking and parity bits to the data. A rate controller 203 according to the invention may then process the data as described in greater detail below. The rate-controlled data generated by rate controller 203 may then be input to digital modulator 204, which may modulate the data according to some digital modulation scheme such as QAM (quadrature amplitude modulation). The modulated data may then be transmitted via a wireless channel by an antenna 205 to a plurality of receivers 105.

Transmitter 210 of base station 100 may comprise computational resources such as computer processors, memory, storage media such as disks, and software for processing data as described above. These computational resources and associated channel bandwidth are collectively referred to herein as "transmitter resources." Because the channel bandwidth may be used to transmit data to a plurality of users, the transmitter resources may be committed to some multiplexing scheme. In such a multiplexing scheme, the available bandwidth of the channel may be partitioned into "channel resource slots." These channel resource slots may be time slots, frequency slots or frequency-time slots. As is well understood in time division multiplexing (TDM), for example, available channel resources are partitioned into time slots, wherein individual time slices of bandwidth are allocated to different users. Other multiplexing schemes which may be used according to embodiments of the invention include frequency division multiplexing and frequency-time division multiplexing.

As noted earlier, a plurality of users 101 may download information from Internet 104 or some other data source, resulting in a plurality of data frames targeted for a plurality of receivers 105 being sent to transmitter 210 of base station 100. After being processed by source encoder 201 and channel encoder 202 as described above, the data frames targeted to respective receivers may be processed by rate controller 203 according to embodiments of the invention. It should be understood that typical digital communication systems are not multi-rate, and therefore lack rate controller 203 as shown. Rate controller 203 may comprise a frame buffer 206 wherein a queue 208 of the targeted data frames received from the channel encoder is maintained. Rate controller 203 may further comprise a frame selector 207.

As discussed above, transmitter 210 of base station 100 may comprise computer processors, memory, storage and software for implementing its functions. In particular, frame selector 207 may be implemented in computer-executable instructions, and frame buffer 206 containing queue 208 may be maintained in a memory of the transmitter. Frame buffer 206 could be formatted, for example, as an array, or as a linked list.

Frame selector 207 may be configured to select a data frame from queue 208 to transmit, based on the data reception rate capability of the target receiver of the selected data frame. To select the data frame, a data reception rate capability of the target receiver of the queued frame may be identified. If the data reception rate capability of the target receiver is not exceeded by transmitting the queued data frame in a next consecutive channel resource slot, the queued data frame may be transmitted to the target receiver. Otherwise, the queue may be searched for a data frame which can be transmitted in the next consecutive channel resource slot without exceeding the data reception rate capability of its target receiver.

Figure 3A:
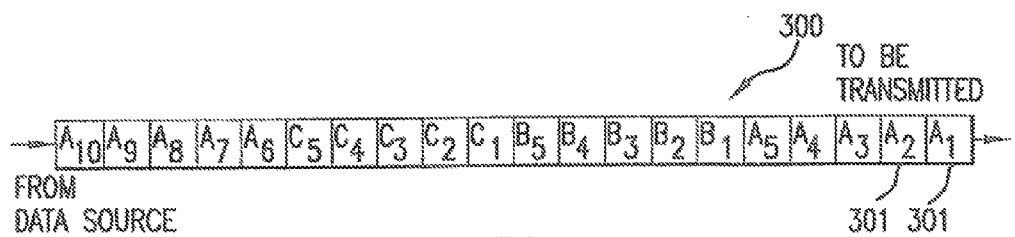
FIGS. 3A-3C show an example of rate control according to an embodiment of the invention.
Figure 3B:
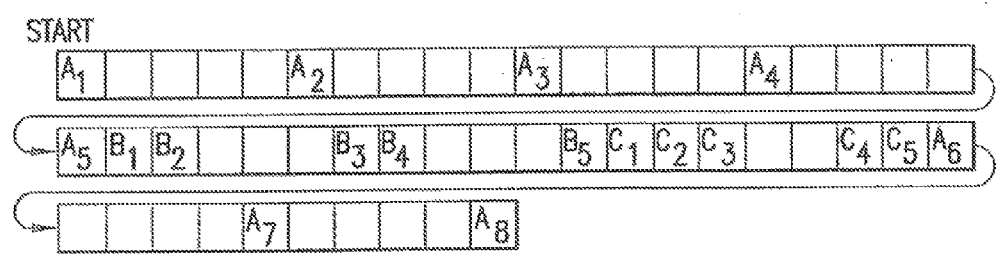
Figure 3C:
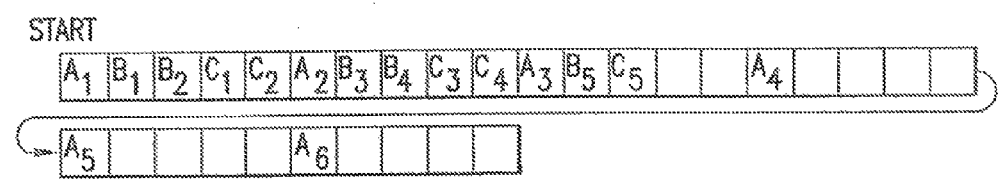

FIGS. 3A-3C illustrate an example of the foregoing. For ease of understanding, an example wherein the channel resource slots are time slots is discussed. However, it should be understood that the channel resource slots could alternatively be frequency slots or frequency-time slots.

In FIG. 3A, a sequence 300 of data frames 301 is shown. "A", "B" and "C" indicate respective target receivers of the data frames; i.e., a receiver A is the destination of frames $A_1$-$A_{10}$, a receiver B is the destination of frames $B_1$-$B_5$, and a receiver C is the destination of frames $C_1$-$C_5$. Subscripts denote the sequence in which the frames should be transmitted to their respective receivers.

Typically, the frames would arrive at base station 100 in "bursts," as shown: i.e. in groupings of consecutive frames targeted to one receiver. In the example of FIG. 3A, each burst is five frames long; two bursts are directed to receiver A, and one burst each is directed to receivers B and C.

In this example, assume that base station 100 can transmit data at a maximum rate of 1 frame per second. Also, assume that each second corresponds to a time slot of the channel resource slots. Further, assume that receiver A has a data reception rate capability of 1 frame per 5 seconds, receiver B has a data reception rate capability of 2 frames per 5 seconds, and receiver C has a data reception rate capability of 3 frames per 5 seconds.

FIG. 3B shows how the frames might be transmitted to their respective target receivers in the absence of rate control according to the invention. The "oldest" frames, i.e., the frames which have been queued the longest, should be transmitted first. Thus, frames $A_1$-$A_5$ are to be transmitted first. However, because receiver A has a data reception rate capability of only 1 frame per 5 seconds, base station 100 must wait four seconds after transmitting frame $A_1$ before it can transmit frame $A_2$, since otherwise, the data reception rate capability of receiver A would be exceeded. Thus, four time slots of the channel resource slots are wasted. Similarly, four time slots are wasted between the transmitting of each of $A_3$, $A_4$ and $A_5$.

When it is the turn of frames B1-B5 to be transmitted to receiver B, two frames can be sent in consecutive time slots as shown. However, because the data reception rate capability of receiver B is only 2 frames per 5 seconds, three time slots are wasted between the transmitting of $B_2$ and $B_3$, and $B_4$ and $B_5$.

Because the data reception rate capability of receiver C is 3 frames per 5 seconds, three frames targeted to receiver C can be transmitted in three consecutive time slots. However, two time slots are wasted, as shown.

Finally, when the second burst targeted to receiver A is transmitted, four times slots per frame are again wasted.

FIG. 3C shows, by contrast, the transmission of sequence 300 with rate control according to embodiments of the invention. Assume that sequence 300 has been queued in frame buffer 206. Again, oldest frames are transmitted first. Thus, frame A.sub.1 is transmitted first as before, but it is then determined that transmitting frame A.sub.2 in the next consecutive time slot would exceed the data reception rate capability of receiver A. Thus, queue 208 in frame buffer 206 is searched for a frame that can be transmitted in the next consecutive time slot without exceeding the data reception rate capability of its target receiver. In this example, B.sub.1 is the next frame in queue 208 that can be transmitted in the next consecutive time slot without exceeding the data reception rate capability of its target receiver. Accordingly, frame B.sub.1 is transmitted in the time slot consecutive to A.sub.1's time slot, with no need for intervening idle time slots. Similarly, frame B.sub.2 can be transmitted in the time slot consecutive to B.sub.1's time slot without exceeding the data reception rate capability of receiver B.

However, because the data reception rate capability of receiver B is only 2 frames per 5 seconds, it is next determined that frame B.sub.3 cannot be transmitted in the time slot consecutive to frame B.sub.2's time slot. Thus, queue 208 in frame buffer 206 is searched for a frame that can be transmitted in the next consecutive time slot without exceeding the data reception rate capability of its target receiver.

Accordingly, frame C.sub.1 is then selected for transmission. Frame C.sub.1 is transmitted in the time slot consecutive to frame B.sub.2's time slot, with no need for intervening idle slots. Similarly, frame C.sub.2 can be sent in the time slot consecutive to C.sub.1's time slot.

Next, because four time slots have elapsed since frame A.sub.1 was transmitted, frame A.sub.2, the oldest frame in queue 208, can now be transmitted, in the time slot consecutive to C.sub.2's time slot. Frame A.sub.3 cannot be transmitted next, however, so frames B.sub.3, B.sub.4, C.sub.3 and C.sub.4 are transmitted in the four consecutive time slots following frame A.sub.2's time slot, by making the same determinations as described above in connection with frames B.sub.1, B.sub.2, C.sub.1 and C.sub.2.

Next, because four time slots have elapsed since frame A.sub.2 was transmitted, frame A.sub.3 can now be transmitted, in the time slot consecutive to C.sub.4's time slot. Frames B.sub.5 and C.sub.5 are then transmitted in the next two consecutive time slots.

Finally, frames A.sub.4, A.sub.5 and A.sub.6 are transmitted. In this particular example, a non-refreshed queue has been discussed, and therefore idle time slots occur between the time slots for frame C.sub.5 and A.sub.4, and the time slots for frames A.sub.5 and A.sub.6. In practice, new data frames would be continually fed to frame buffer 206 and added to queue 208, and such idle slots would not occur in significant numbers.

Figure 4:
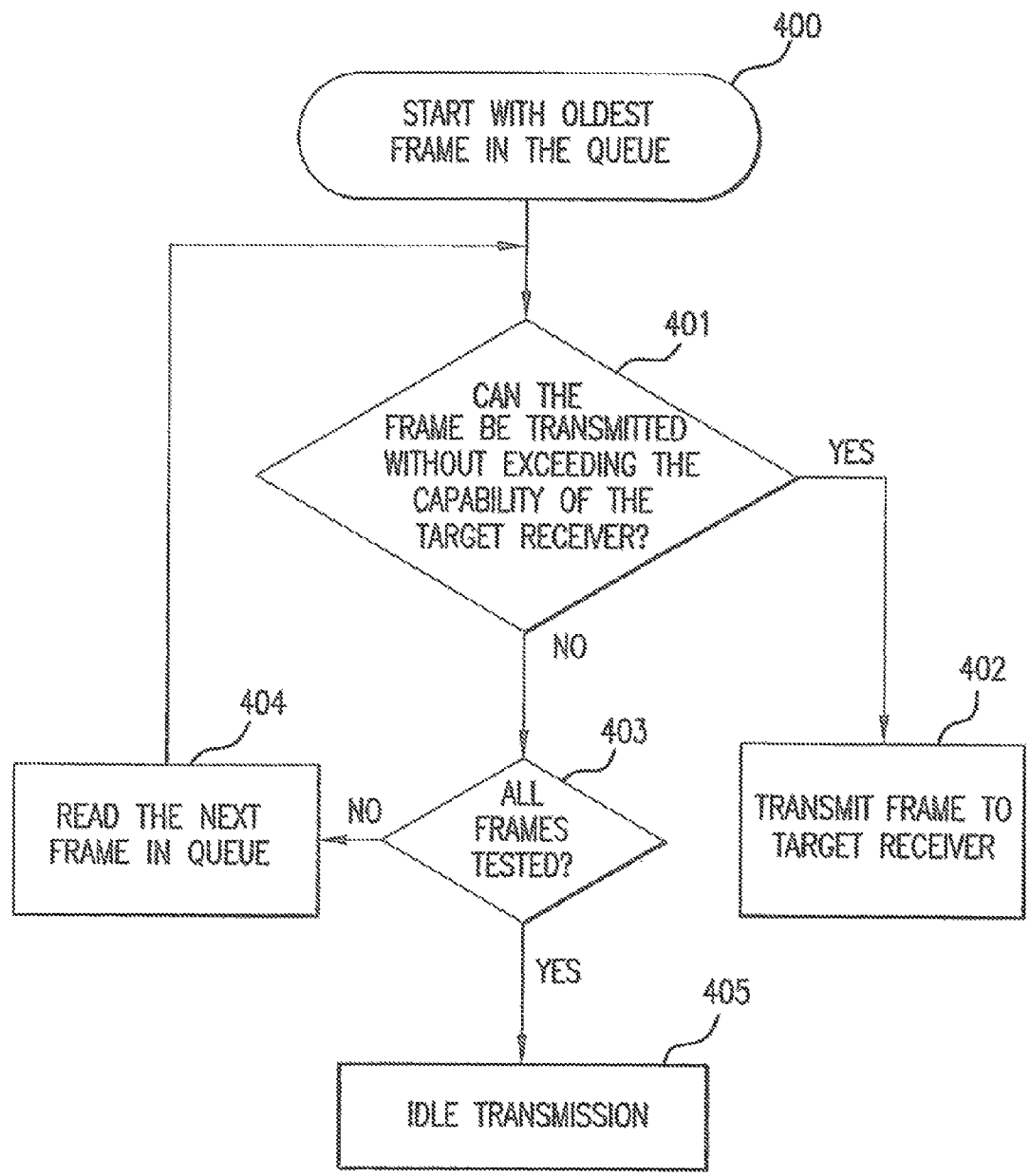
FIG. 4 is a flowchart illustrating rate control according to an embodiment of the invention.

FIG. 4 shows the foregoing process in flowchart form. The flowchart shows the process on a per-time slot basis; i.e., the process determines, for a given time slot, whether a frame can be transmitted or whether the time slot must be idled.

As shown in ellipse 400, the process starts with the oldest frame in queue 208. As shown in block 401, it is determined whether the frame can be transmitted to its target receiver in the next consecutive time slot of the channel resource slots without exceeding the data reception rate capability of the target receiver. In order to implement this step, according to one embodiment, the data reception rate capability of the target receiver could be included in the frame header. Alternatively, the data reception rate capability of each receiver in the network could be included in a look-up table accessible to frame selector 207. After determining the data reception rate capability of the target receiver, frame selector 207 could compare it with a running tally of how many frames had been transmitted to the target receiver within the past N consecutive time slots, where N was some suitably-chosen, user-dependent number.

If the data reception rate capability of the target receiver was not exceeded, the frame could be transmitted to the target receiver, as shown in block 402.

If the data reception rate capability of the target receiver was exceeded, however, the frame could not be transmitted to the target receiver. Thus, a check could be performed to determine whether all the frames in queue 208 had been tested for whether they could be transmitted in the next consecutive time slot, as shown in block 403. If not, the next frame in queue 208 could be read and tested, as shown in block 404.

On the other hand, if all queued frames had been tested and none could be transmitted in the next consecutive time slot without exceeding the data reception rate capability of its target receiver, transmission of data could be idled for that time slot, as shown in block 405.

As noted above, frame selector 207 may be implemented in computer-executable instructions, which when executed by a processor carry out the advantageous features of the invention. The computer-executable instructions could be tangibly embodied in computer-usable media such as diskettes, magnetic tapes, CD-ROMs, RAM, ROM, FPGAs (Field Programmable Gate Arrays) or ASICs (Application Specific Integrated Circuits).

What has been described is merely illustrative of the application of the principles of the present invention. Other arrangements and methods can be implemented by those skilled in the art without departing from the spirit and scope of the present invention.

What is claimed is:

1. A method, comprising:
   determining, by a system comprising a processor, a limit of a data frame reception rate of a receiver, wherein the limit of the data frame reception rate of the receiver is represented as a number of data frames per time slot of channel resource slots; and
   selecting, by the system, a data frame for transmission to the receiver based on the limit of the data frame reception rate of the receiver.

2. The method of claim 1, wherein the selecting comprises:
   comparing the the limit on the data frame reception rate of the receiver with a number of data frames transmitted to the receiver within a number of consecutive time slots of the channel resource slots.

3. The method of claim 1, wherein the selecting comprises:
   determining whether the limit on the data frame reception rate of the receiver is to be exceeded by the data frame being transmitted within a next consecutive time slot of the channel resource slots for which the selecting of the data frame is occurring.

4. The method of claim 3, further comprising:
   directing, by the system, the transmission of the data frame to the receiver in response to the limit on the data frame reception rate of the receiver being determined not to be exceeded by the data frame being transmitted within the next consecutive time slot.

5. The method of claim 3, further comprising:
selecting, by the system, another data frame for another transmission to another receiver based on a another limit on another data frame reception rate of the other receiver in response to the limit on the data frame reception rate of the receiver being determined to be exceeded by the data frame being transmitted within the next consecutive time slot.

6. The method of claim 5, further comprising:
directing, by the system, the other transmission of the other data frame to the other receiver in response to the other limit on the other data frame reception rate of the other receiver being determined not to be exceeded by the other data frame being transmitted within the next consecutive time slot.

7. The method of claim 3, further comprising:
searching, by the system, a queue of data frames for another data frame for another transmission to another receiver in response to the limit on the data frame reception rate of the receiver being determined to be exceeded by the data frame being transmitted within the next consecutive time slot.

8. The method of claim 7, further comprising:
directing, by the system, the other transmission of the other data frame to the other receiver in response to the other limit on the other data frame reception rate of the other receiver being determined not to be exceeded by the other data frame being transmitted within the next consecutive time slot.

9. The method of claim 7, further comprising:
idling, by the system, data frame transmission during the next consecutive time slot in response to the searching the queue of the data frames for the other data frame being determined to have been initiated.

10. The method of claim 9, wherein the idling further includes idling the data frame transmission during the next consecutive time slot in response to determining that no data frame of the data frames is transmittable to an associated receiver in the next consecutive time slot without exceeding a a respective limit on a respective data frame reception rate of the associated receiver.

11. The method of claim 1, wherein the determining the limit comprises determining the limit on the data frame reception rate of the receiver in the data frame based on information received in the data frame.

12. The method of claim 1, wherein the determining the limit comprises requesting the limit on the data frame reception rate of the receiver from a look-up data structure.

13. An apparatus, comprising:
a memory to store instructions; and
a processor, communicatively coupled to the memory, that facilitates the execution of the instructions to perform operations, comprising:
storing data frames in a frame buffer for transmission to receivers associated with the data frames;
determining a bound on a data frame reception rate of a receiver of the receivers, wherein the bound on the data frame reception rate of the receiver is represented as a number of data frames per time slot of channel resource slots; and
selecting a data frame of the data frames for transmission to the receiver based on the bound on the data frame reception rate of the receiver.

14. The apparatus of claim 13, wherein the selecting comprises comparing the bound on the data frame reception rate of the receiver with a number of data frames transmitted to the receiver within a number of consecutive time slots of the channel resource slots.

15. The apparatus of claim 13, wherein the selecting comprises:
determining whether the bound on the data frame reception rate of the receiver will be exceeded by transmitting the data frame to the receiver within a next consecutive time slot of the channel resource slots for which the selecting of the data frame is occurring, and the operations further comprise:
transmitting the data frame to the receiver in response to determining the bound on the data frame reception rate of the receiver will not be exceeded by transmitting the data frame to the receiver within the next consecutive time slot.

16. The apparatus of claim 15, further comprising selecting another data frame of the data frames for transmission to another receiver of the receivers, based on another bound on another data frame reception rate of the other receiver, in response to determining the bound on the data frame reception rate of the receiver will be exceeded by transmitting the data frame within the next consecutive time slot.

17. The apparatus of claim 16, wherein the selecting the other data frame comprises determining whether another bound on the other data frame reception rate of the other receiver will be exceeded by transmitting the other data frame to the other receiver within the next consecutive time slot, and the operations further comprise:
transmitting the other data frame to the other receiver in response to determining the other bound on the other data frame reception rate of the other receiver will not be exceeded by transmitting the other data frame to the other receiver within the next consecutive time slot.

18. The apparatus of claim 13, wherein the bound on the data frame reception rate of the receiver is determined from information included in the data frame.

19. A computer readable storage device comprising computer-executable instructions that, in response to execution, cause a system comprising a processor to perform operations, comprising:
determining a capability of a of a receiver of receivers relating to a data frame reception rate of the receiver, wherein the capability of the receiver is represented as an amount of data frames per time slot of channel resource slots; and
transmitting a data frame of a plurality of data frames to the receiver based on the capability of the receiver.

20. The computer readable storage device of claim 19, wherein the operations further comprise:
transmitting another data frame of the plurality of data frames to another receiver of the receivers based on the capability of the receiver and another capability of the other receiver related to another data frame reception rate determined for the other receiver.

* * * * *